United States Patent
Hartog et al.

(10) Patent No.: US 12,387,602 B2
(45) Date of Patent: Aug. 12, 2025

(54) REDUCTION OF THE RISK OF COLLISION WITH AN OBSCURED MOTOR VEHICLE

(71) Applicants: Volkswagen Aktiengesellschaft, Wolfsburg (DE); KTM AG, Mattighofen (AT)

(72) Inventors: Johannes Hartog, Braunschweig (DE); Daniel Hermann, Sassenburg/Stuede (DE); Markus Schwarz, Edling (DE); Klaus Krumpholz, Rosenheim (DE); Thomas Biehle, Gross Oesingen (DE)

(73) Assignees: Volkswagen Aktiengesellschaft, Wolfsburg (DE); KTM AG, Mattighofen (AT)

( * ) Notice: Subject to any disclaimer, the term of this patent is extended or adjusted under 35 U.S.C. 154(b) by 150 days.

(21) Appl. No.: 17/925,809

(22) PCT Filed: May 14, 2021

(86) PCT No.: PCT/EP2021/062815
§ 371 (c)(1),
(2) Date: Nov. 16, 2022

(87) PCT Pub. No.: WO2021/233777
PCT Pub. Date: Nov. 25, 2021

(65) Prior Publication Data
US 2023/0196918 A1 Jun. 22, 2023

(30) Foreign Application Priority Data
May 18, 2020 (DE) .......................... 102020206246.3

(51) Int. Cl.
*G08G 1/16* (2006.01)
*B60Q 9/00* (2006.01)
(Continued)

(52) U.S. Cl.
CPC .............. *G08G 1/162* (2013.01); *B60Q 9/008* (2013.01); *B60T 7/22* (2013.01); *G08G 1/166* (2013.01);
(Continued)

(58) Field of Classification Search
None
See application file for complete search history.

(56) References Cited

U.S. PATENT DOCUMENTS 6,252,520 B1   6/2001   Asami et al.
6,864,784 B1 *  3/2005   Loeb ................ G08G 1/096716
                                                340/936
(Continued)

FOREIGN PATENT DOCUMENTS

CN    105378815 A    3/2016
CN    107921968 A    4/2018
(Continued)

OTHER PUBLICATIONS

Corresponding Japanese Patent Application 2022-570156. Office Action (Oct. 26, 2023).
(Continued)

*Primary Examiner* — Muhammad Adnan
(74) *Attorney, Agent, or Firm* — Peter Zura; LOZA & LOZA, LLP

(57) ABSTRACT

Technologies and techniques for reducing a collision risk between a first motor vehicle and a second motor vehicle. At least a first vehicle-to-environment message is transmitted by the first motor vehicle and received by the second motor vehicle. Using a second computing unit of the second motor vehicle, it is determined, depending on the vehicle-to-environment message, whether a risk situation exists in which the first motor vehicle is obscured by a preceding third motor vehicle. The second computing unit executes a
(Continued)

criticality analysis to determine that the risk situation exists and, depending on the result of the criticality analysis, a risk-reducing measure is initiated.

20 Claims, 1 Drawing Sheet

(51) Int. Cl.
*B60T 7/22* (2006.01)
*H04L 67/12* (2022.01)
(52) U.S. Cl.
CPC ....... *B60T 2210/20* (2013.01); *B60T 2210/32* (2013.01); *H04L 67/12* (2013.01)

(56) References Cited

U.S. PATENT DOCUMENTS

| | | | | |
|---|---|---|---|---|
| 7,688,188 | B2* | 3/2010 | Kume | G08G 1/162 |
| | | | | 340/995.13 |
| 10,446,033 | B2 | 10/2019 | Mills et al. | |
| 10,453,344 | B2 | 10/2019 | Ishii et al. | |
| 11,639,132 | B2* | 5/2023 | Yamoto | G08G 1/166 |
| | | | | 340/435 |
| 11,887,481 | B2* | 1/2024 | Koppisetty | B60W 30/18145 |
| 11,981,255 | B2* | 5/2024 | Mimura | B60Q 5/006 |
| 12,080,171 | B2* | 9/2024 | Inoue | G08G 1/164 |
| 12,112,635 | B2* | 10/2024 | Peranadam | H04W 4/029 |
| 2006/0055525 | A1 | 3/2006 | Kubota et al. | |
| 2007/0282532 | A1* | 12/2007 | Yamamoto | B60R 21/0134 |
| | | | | 701/96 |
| 2010/0157430 | A1* | 6/2010 | Hotta | G02B 27/01 |
| | | | | 359/630 |
| 2011/0087433 | A1* | 4/2011 | Yester | G08G 1/09671 |
| | | | | 701/469 |
| 2015/0091740 | A1* | 4/2015 | Bai | B60K 35/00 |
| | | | | 340/901 |
| 2015/0228195 | A1* | 8/2015 | Beaurepaire | B60Q 1/547 |
| | | | | 340/907 |
| 2017/0076599 | A1* | 3/2017 | Gupta | G08G 1/163 |
| 2017/0213462 | A1* | 7/2017 | Prokhorov | G08G 1/166 |
| 2018/0075747 | A1* | 3/2018 | Pahwa | G08G 1/205 |
| 2018/0162388 | A1* | 6/2018 | You | B60R 1/27 |
| 2018/0233049 | A1 | 8/2018 | Ishii et al. | |
| 2018/0261081 | A1* | 9/2018 | Suzuki | B60Q 1/525 |
| 2019/0096255 | A1 | 3/2019 | Mills et al. | |
| 2019/0351899 | A1* | 11/2019 | Adam | B60W 30/09 |
| 2020/0025585 | A1* | 1/2020 | Hilgers | G06Q 10/02 |
| 2020/0133282 | A1* | 4/2020 | Choi | B60W 30/09 |
| 2021/0188162 | A1* | 6/2021 | Yoshizawa | B60W 50/16 |
| 2021/0197846 | A1* | 7/2021 | Thakur | G01S 17/931 |
| 2021/0271249 | A1* | 9/2021 | Kobashi | G06V 20/58 |
| 2021/0370823 | A1* | 12/2021 | Stein | G06V 20/588 |
| 2023/0021615 | A1* | 1/2023 | Inaba | B60T 7/22 |
| 2023/0064724 | A1* | 3/2023 | Morimura | G08G 1/166 |
| 2023/0196920 | A1* | 6/2023 | Naserian | B60Q 9/008 |
| | | | | 701/26 |

FOREIGN PATENT DOCUMENTS

| | | |
|---|---|---|
| CN | 109532657 A | 3/2019 |
| CN | 109835253 A | 6/2019 |
| CN | 111164663 A | 5/2020 |
| DE | 102018213223 A1 | 2/2020 |
| EP | 3404638 A1 | 11/2018 |
| JP | H07225274 A | 8/1995 |
| JP | 2000357298 A | 12/2000 |
| JP | 2007310457 A | 11/2007 |
| KR | 20190066114 A | 6/2019 |

OTHER PUBLICATIONS

PCT/EP2021/062815 International Search Report (Aug. 3, 2021).
PCT/EP2021/062815. International Preliminary Report on Patentability (Nov. 17, 2022).

* cited by examiner

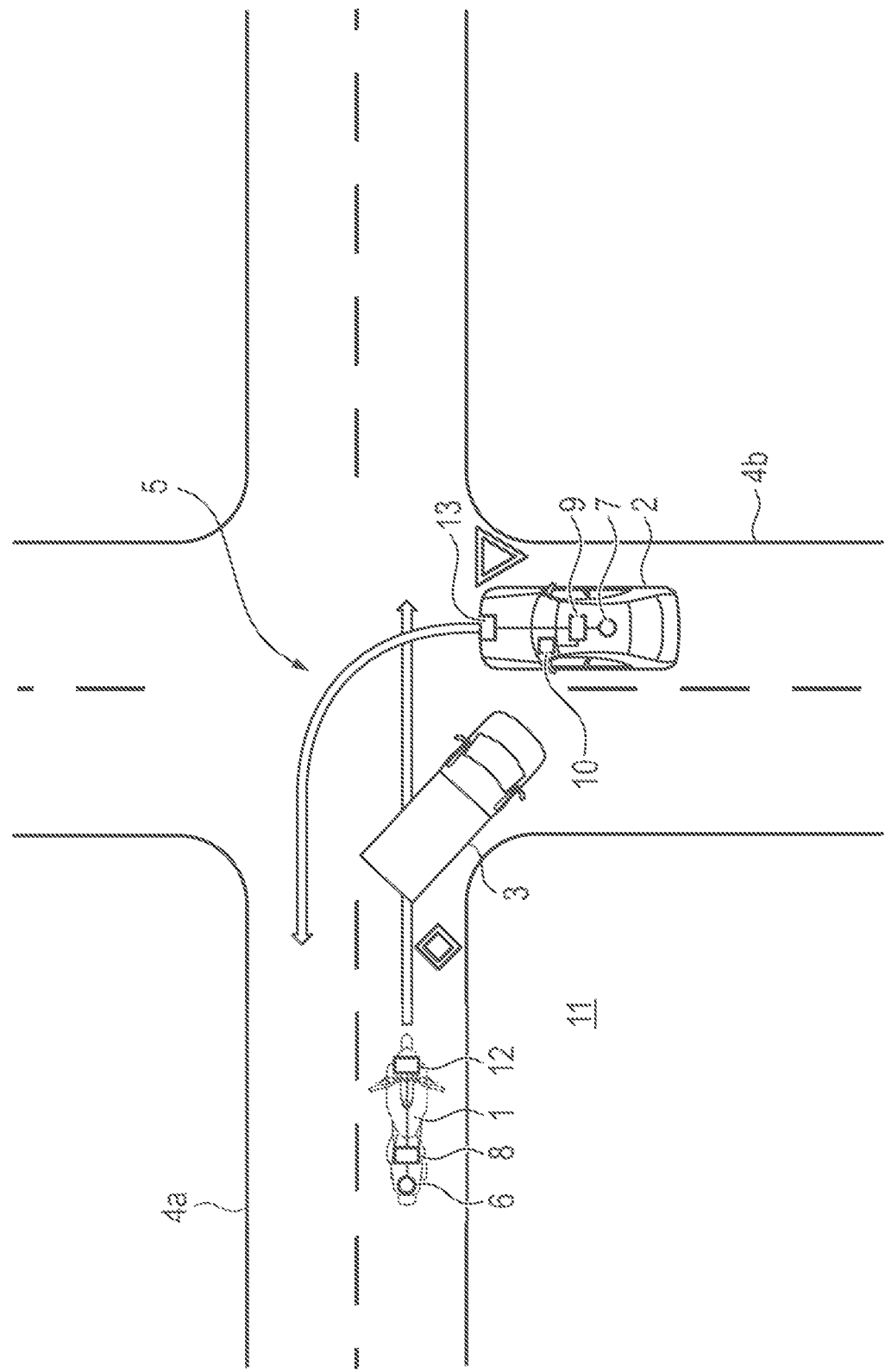

REDUCTION OF THE RISK OF COLLISION WITH AN OBSCURED MOTOR VEHICLE

The present application claims priority to International Patent App. No. PCT/EP2021/062815 to Hartog, et al., titled "Reducing A Risk Of Collision With An Obscured Motor Vehicle", filed May 14, 2021, which claims priority to German Patent App. No. 10 2020 206 246.3, filed on May 18, 2020, the contents of each being incorporated by reference in their entirety herein.

TECHNICAL FIELD

The present disclosure relates to methods for reducing a risk of collision between a first motor vehicle, which may be a motorcycle, and a second motor vehicle, wherein the first motor vehicle and the second motor vehicle travel on respectively different roads towards a common cross-roads or junction of the roads, and at least one first vehicle-to-environment message is transmitted by the first motor vehicle and received by the second motor vehicle. In addition, the present disclosure also relates to a corresponding system for reducing a risk of collision.

BACKGROUND

If a motor vehicle is obscured by another preceding and optionally larger, motor vehicle, this can result in severe accidents at cross-roads or junctions. In particular in case of motorcycles, this is relevant since they can be easily obscured by other motor vehicles due to their comparatively low size. For example, accident statistics show that a predominant majority of all of the accidents with motorbike involvement in Germany occurs in the area of crossroads and these accidents are not caused by the motorcyclists for the most part. Therein, the driver as well as camera or radar systems of the involved motor vehicle are often not capable of timely recognizing obscured motorbikes. Analogously, this problem also arises for the rider of the motorbike.

In the document US 2011/0095907 A1, a device for assisting a motor vehicle in turning right is described. Therein, by means of a processing unit of a vehicle, which is about to turn right, depending on the difficulty of recognizing a following vehicle due to a dead angle of a preceding vehicle, a rank for the dead angle is determined. Depending thereon, the driver of the motor vehicle turning right is correspondingly informed.

SUMMARY

Against this background, aspects of the present disclosure are directed to specify an improved concept for reducing a risk of collision between motor vehicles, which can reduce a risk for or by the collision even in the case, in which one of the motor vehicles is obscured for the other motor vehicle.

Presently, certain aspects are solved by the respective subject matter of the independent claims. Advantageous developments and preferred embodiments are subject matter of the dependent claims.

Generally, an aspect of the improved concept is based on the idea of transmitting a vehicle-to-environment message by the potentially obscured motor vehicle itself, and to perform an analysis by the further motor vehicle based on the vehicle-to-environment message to determine the obscuration and to assess the criticality of the situation, if applicable.

In some examples, a method is disclosed for reducing a risk of collision between a first motor vehicle, which may be a motorcycle, for example a motorbike, and a second motor vehicle. Therein, the first motor vehicle and the second motor vehicle travel on respectively different roads towards a common crossroads or junction of the roads. At least one first vehicle-to-environment message is transmitted by the first motor vehicle, in particular generated and transmitted by means of a first communication interface of the first motor vehicle, and the at least one first vehicle-to-environment message is received by the second motor vehicle, for example, via a second communication interface of the second motor vehicle. By means of a second computing unit of the second motor vehicle, it is determined depending on the at least one first vehicle-to-environment message if a risk situation exists, in which the first motor vehicle is obscured for a driver of the second motor vehicle and/or for an environmental sensor system of the second motor vehicle by a third motor vehicle preceding the first motor vehicle. By means of the second computing unit, a criticality analysis is performed if it has been determined that the risk situation exists, and depending on a result of the criticality analysis, a risk-reducing measure is initiated to reduce the risk of collision.

In some examples, a system is disclosed for reducing a risk of collision between a first motor vehicle, such as a motorcycle, and a second motor vehicle, wherein the first and the second motor vehicle travel on respectively different roads towards a common crossroads or junction of the roads. The system may include a first communication interface for the first motor vehicle, which is configured to transmit at least one first vehicle-to-environment message. The system may include a second communication interface for the second motor vehicle, which is configured to receive the at least one first vehicle-to-environment message. The system may include a second computing unit for the second motor vehicle, which is configured to determine if a risk situation exists, in which the first motor vehicle is obscured for a driver of the second motor vehicle and/or for an environmental sensor system of the second motor vehicle by a third motor vehicle preceding the first motor vehicle, depending on the at least one first vehicle-to-environment message. The second computing unit may be configured to perform a criticality analysis if it has been determined that the risk situation exists, and to initiate a risk-reducing measure depending on a result of the criticality analysis.

Further embodiments of the system according to the improved concept follow directly from the different embodiments of the method for reducing a risk of collision according to the improved concept and vice versa. In particular, a system according to the improved concept can be configured or programmed to perform a method according to the improved concept or the system performs such a method.

Further features of the present disclosure are apparent from the claims, the figures and the description of figures. The features and feature combinations disclosed herein can be encompassed not only in the respectively specified combination, but also in other combinations according to the improved concepts. Thus, such implementations of the improved concepts are also encompassed and disclosed, which are not explicitly shown in the figures and/or explained, but arise from and can be generated by separated feature combinations from the explained implementations. Thus, implementations and feature combinations are in particular also encompassed and disclosed, which do not include all of the features of an originally formulated claim. Moreover, implementations and feature combinations are encompassed and disclosed, which extend beyond or deviate from the feature combinations set out in the relations of the claims.

The present disclosure also includes the combinations of the features of the described embodiments.

BRIEF DESCRIPTION OF THE DRAWINGS

In the following, an embodiment of the present disclosure is described. Therein:

The sole FIGURE shows schematically an exemplary embodiment of a system for reducing a risk of collision according to the improved concept.

DETAILED DESCRIPTION

In some examples, a motor vehicle travels on a road, and can also include situations, in which the motor vehicle temporarily stands caused by traffic or by some other condition, for example at traffic lights, at the crossroads or junction or due to slow-moving traffic.

By the risk of collision, a probability or a risk that a collision occurs between the first and the second motor vehicle, and/or a risk that severe damages or injuries of the involved persons and/or motor vehicles occur by an actual collision can be understood.

Therefore, as the risk-reducing measure, each measure may come into consideration, which reduces the risk for the actual occurrence of the collision and/or reduces the prospective severity of the actual collision and therefore a risk of injury or a severity of the injury for involved persons.

For example, the first motor vehicle can include a first computing unit. The first computing unit may be coupled to the first communication interface to control it for generating and transmitting the at least one first vehicle-to-environment message.

In some examples, a vehicle-to-environment message may be configured as a message wirelessly transmitted by means of a motor vehicle communication interface, for exchanging information and/or data between the transmitting motor vehicle and a further motor vehicle, or between the motor vehicle and an infrastructure device in an environment of the motor vehicle can be understood. In case of a communication between two motor vehicles, the corresponding communication is also referred to as car-to-car communication, C2C communication, vehicle-to-vehicle communication or V2V communication. In the general case of a communication between a motor vehicle and a receiving unit not defined in more detail in the environment of the motor vehicle, which can be an infrastructure device or a motor vehicle, it is spoken of C2X or V2X. Therefore, the designation C2X is used exchangeably with "vehicle-to-environment" herein.

The C2X communication or the C2X messages can be standardized in some examples. For example, the C2X messages described herein can include messages according to the European Telecommunication Standards Institute, ETSI, for example one or more CAM (Cooperative Awareness Message) messages or one or more CPM (Collective Perception Message) messages. A CAM message can also be referred to as vehicle-to-environment status message, a CPM message can also be referred to as vehicle-to-environment sensor message.

That the first and the second motor vehicle travel along the different roads towards the common crossroads or junction of the roads, may be understood such that a probable trajectory of the first motor vehicle crosses a probable trajectory of the second motor vehicle. For example, the first motor vehicle can be about to straight traverse the junction or crossroads, while the second motor vehicle can be about to turn at the crossroads or junction. In such a situation, the first motor vehicle can have the priority with respect to the second motor vehicle. This makes the situation particularly important, since a driver of the first motor vehicle potentially relies on the priority rule, and accordingly, the potential of a second motor vehicle suddenly appearing would be particularly surprising for the driver of the first motor vehicle.

That the first motor vehicle is obscured by the third motor vehicle for the driver of the second motor vehicle, can in particular be understood such that the first motor vehicle is completely or to a preset minimum proportion in a spatial area, which the driver fundamentally cannot see, due to a geometric obscuration by the third motor vehicle. Analogously, it can also be understood that the first motor vehicle is obscured by the third motor vehicle for the environmental sensor system of the second motor vehicle.

In some examples, situations can also be taken into account, in which the first motor vehicle would be recognizable for the driver of the second motor vehicle, and thus would not be obscured from geometric points of view, but the presence of the first motor vehicle is not consciously realized due to an inattention or other cognitive phenomena of the driver of the second motor vehicle and it is correspondingly not reacted thereto.

Motorcycles are often missed by car drivers although they would be well recognizable from geometric or generally visual points of view. This can be traced back at least partially to the fact that a driver of a car in the regular road traffic is faced with further cars, but not with motorcycles in the predominant number of the cases. Corresponding embodiments are explained in detail below.

In some examples, the risk-reducing measure may be performed, depending on the result of the criticality analysis, which in turn may be performed only if the risk situation exists according to the at least one vehicle-to-environment message, the presence of the risk situation in particular presents a necessary condition for initiating the risk-reducing measure. In various forms of configuration of the method, the presence of the risk situation can also be a sufficient condition. In such forms of configuration, the criticality analysis for example only serves for verifying the presence of the risk situation for example based on further information, for instance based on sensor data of an environmental sensor system of the second motor vehicle. However, the presence of the risk situation may preferably a necessary, but not necessarily sufficient condition for initiating the risk-reducing measure.

The second motor vehicle can in particular be a car, a passenger car, a truck, a utility vehicle or also a motorcycle or motorbike. The third motor vehicle can be a car, a passenger car, a truck or a utility vehicle.

Here, an environmental sensor system can be understood as a sensor system, which is capable of generating sensor data or sensor signals, which image, represent or reproduce an environment of the environmental sensor system. In some examples, the capability of capturing electromagnetic or other signals from the environment, may not alone be sufficient to deem a sensor system an environmental sensor system. For example, camera systems, lidar systems, radar systems or ultrasonic sensor systems can be referred to as environmental sensor systems.

In particular, the environmental sensor system of the second motor vehicle, which is also referred to as second environmental sensor system in the following, can include a camera system, a radar system, a lidar system and/or an ultrasonic sensor system.

In some examples, the first motor vehicle may be obscured by the third motor vehicle, and cannot be recognized by the driver of the second motor vehicle and/or the second environmental sensor system. However, the driver and/or the second environmental sensor system correspondingly either cannot or cannot reliably determine the fact that the first motor vehicle is obscured by the third motor vehicle. By the improved concept, therefore, the possibility of recognizing the obscuration of the first motor vehicle is given on the one hand, in that the at least one first vehicle-to-environment message is transmitted by the first motor vehicle itself and is evaluated by the second motor vehicle. If a critical situation according to the criticality analysis is present, thus, a corresponding risk-reducing measure can be initiated in case of the obscured first motor vehicle. Thereby, accidents between motor vehicles, wherein one of the motor vehicles is obscured by a further motor vehicle, can be prevented or a severity of such an accident can be reduced.

Thus, in some examples, the first motor vehicle can recognize that it is obscured by the third motor vehicle or can at least provide information, which allows the second motor vehicle to determine this.

According to at least one embodiment of the method according to the present disclosure, the criticality analysis is performed by means of the second computing unit depending on the at least one first vehicle-to-environment message.

For example, the at least one first vehicle-to-environment message can include information relating to a state or movement state of the first motor vehicle, relating to a speed, an acceleration, a prospective driving maneuver, a lane, one which the first motor vehicle is located, and so on. For the criticality analysis, this information can be taken into account.

In some examples, the criticality analysis ,ay be performed, based on movement state data of the second motor vehicle, which may be determined by means of a movement sensor system of the second motor vehicle. The movement state data of the second motor vehicle can include a speed, acceleration and the like of the second motor vehicle.

In some examples, first sensor data may be generated by means of a first environmental sensor system of the first motor vehicle and/or second sensor data is generated by means of the second environmental sensor system of the second motor vehicle.

According to at least one embodiment, the criticality analysis may be performed depending on the first sensor data and/or the second sensor data.

For example, the second computing unit can estimate if the trajectories of the first and the second motor vehicle actually or prospectively actually intersect, based on the available information, in particular the first and/or second sensor data and/or the movement state data of the first and/or second motor vehicle. Thus, it can be determined if there is a period of time, during which a distance of the first and the second motor vehicle to each other is less than a preset critical distance, which could then potentially be associated with a collision. In this case, it can be spoken of intersecting trajectories.

Based on the available data and information, the second computing unit can also determine if avoiding or braking is possible for the second motor vehicle to prevent the collision. The criticality analysis can also be performed based on this information or the result of this examination.

In some examples, the second computing unit determines a probability for the fact that the first motor vehicle is obscured by the third motor vehicle, based on the at least one first vehicle-to-environment message and optionally based on the first and/or second sensor data, and performs the criticality analysis based on the probability for the obscuration.

In some examples, the at least one first vehicle-to-environment message includes one or more C2X messages, in particular one or more C2C messages.

In some examples, first sensor data, representing an environment of the first motor vehicle situated in front of the first motor vehicle in direction of travel of the first motor vehicle, is generated via the first environmental sensor system of the first motor vehicle. The at least one first vehicle-to-environment message is generated and transmitted depending on the first sensor data, via the first communication interface and/or via the first computing unit.

The first environmental sensor system can include a camera system, a radar system, a lidar system and/or an ultrasonic sensor system.

By the generation of the first sensor data, it can be recognized if the third motor vehicle precedes the first motor vehicle, by the first motor vehicle and by the second motor vehicle, based on the at least one first vehicle-to-environment message. Correspondingly, the probability of the obscuration of the first motor vehicle by the third motor vehicle can be determined based on the first sensor data or the presence of the risk situation can be correspondingly determined.

In some examples, the at least one first vehicle-to-environment message includes a first vehicle-to-environment sensor message relating to the first sensor data and the first vehicle-to-environment message is in particular cyclically transmitted.

Therein, the cyclic transmission of the first vehicle-to-environment sensor message may be configured as a transmission with a preset frequency, which may be an order of magnitude from one to ten Hertz, wherein the first vehicle-to-environment sensor message is correspondingly updated upon each new transmission. If the vehicle-to-environment sensor message is cyclically transmitted or during which period of time it is transmitted, can be the subject of further conditions.

According to at least one embodiment, the sensor message may be examined via the first computing unit of the first motor vehicle, based on the first sensor data if a further motor vehicle, such as the third motor vehicle or a fourth motor vehicle, is within a preset range in front of and/or next to the first motor vehicle. The first vehicle-to-environment sensor message may be cyclically transmitted only if it is determined based on the examination that the further motor vehicle is within the preset range.

Thus, in this manner, it may be determined if the further motor vehicle is on an adjacent lane to the first motor vehicle and/or if it precedes the motor vehicle. Thereby, the second computing unit can recognize the potential obscuration of the first motor vehicle by the further motor vehicle, in particular by the third motor vehicle, based on the first vehicle-to-environment sensor message.

According to at least one embodiment, at least one second vehicle-to-environment message is generated and transmitted by means of the second motor vehicle and received by means of the first motor vehicle.

In some examples, the at least one second vehicle-to-environment message may contain a second vehicle-to-environment status message relating to a current state of the second motor vehicle.

According to at least one embodiment, the first vehicle-to-environment sensor message may be transmitted only if it is determined via the first computing unit that the at least one second vehicle-to-environment message is received by the first motor vehicle.

In that the transmission of the first vehicle-to-environment sensor message is subject to further conditions such as the presence of the further motor vehicle in the preset range or the receipt of the at least one second vehicle-to-environment message, the entire data traffic can be advantageously reduced.

According to at least one embodiment, the message may be further examined with the first computing unit if the crossroads or junction is within a preset distance from the first motor vehicle. In some examples, the first vehicle-to-environment sensor message may be transmitted only if it is determined based on the further examination that the crossroads or junction is within the preset distance.

Accordingly, the entire data traffic can be reduced. Only if the crossroads or the junction is within a certain minimum distance from the first motor vehicle, transmission and optionally receipt of the vehicle-to-environment sensor message is required or reasonable.

In some examples, the first computing unit retrieves digital map data from a database to determine or examine if the crossroads or junction is within the preset distance. The database can be an online or offline database, thus in particular a database, which is on a storage element of a central computer system external to the first motor vehicle or stored on a storage element of the first motor vehicle, in particular of the first computing unit.

According to at least one embodiment, it is determined by means of the first computing unit based on the first sensor data if a preceding motor vehicle, in particular a motor vehicle preceding the first motor vehicle, for example the third motor vehicle, is about to turn at the crossroads or the junction, for example based on a status indication of the preceding motor vehicle or a turn signal indication of the preceding motor vehicle. By means of the first computing unit, it is determined based on this information if the crossroads or junction is within the preset distance.

According to at least one embodiment, the first motor vehicle receives one or more C2X messages from an infrastructure device within an environment of the first motor vehicle, in particular by means of the first communication interface. Based on the C2X message of the infrastructure device, the computing unit examines if the crossroads or junction is within the preset distance.

According to at least one embodiment, the first motor vehicle receives one or more C2X messages from the preceding or further preceding motor vehicles, in particular by means of the first communication interface, which in particular include a travel history of the preceding or further preceding motor vehicle. The travel history can include waypoints over a preset distance, which can for example be in the order of magnitude of 100 m to 500 m. Based on the C2X message of the preceding or further preceding motor vehicle, in particular based on the travel history, the first computing unit examines if the crossroads or junction is in the preset range.

According to at least one embodiment, at least one second C2X message is transmitted by the second motor vehicle and received by the first motor vehicle. By means of the first computing unit, a further criticality analysis is performed if it is determined based on the further examination that the further motor vehicle is within the preset range. By means of the first computing unit, a further risk-reducing measure is initiated depending on a result of the further criticality analysis. Such embodiments do not necessarily require generating the first sensor data by means of the first environmental sensor system.

In other words, the initiation of risk-reducing measures can be effected on the part of the first as well as the second motor vehicle.

According to at least one embodiment, the at least one second C2X message contains a CAM message.

According to at least one embodiment, the at least one first C2X message contains a first C2X status message, in particular a CAM message, relating to a state, in particular current state, of the first motor vehicle and the first C2X status message is in particular cyclically transmitted.

The state of the first motor vehicle can include a movement state, a position, an illumination state or a speed of the first motor vehicle.

According to at least one embodiment, the risk-reducing measure includes outputting a visual, acoustic and/or haptic warning for the driver of the second motor vehicle.

Therein, the configuration of the warning can in particular be effected depending on the ascertained criticality, in particular the actual probability for a possible collision.

According to at least one embodiment, the further risk-reducing measure includes outputting a visual, acoustic and/or haptic warning for the driver of the first motor vehicle.

According to at least one embodiment, the risk-reducing measure includes an automatic intervention in a control of the second motor vehicle and/or the further risk-reducing measure includes an automatic intervention in a control of the first motor vehicle.

Therein, the intervention and the control can in particular include the initiation of braking or prevention of moving off or driving on of the respective motor vehicle.

In some examples, the risk-reducing measure includes outputting a visual and/or acoustic warning into an environment of the second motor vehicle and/or the further risk-reducing measure includes outputting a visual and/or acoustic warning into an environment of the first motor vehicle.

In some examples, driver monitoring data relating to the driver of the second motor vehicle is generated via a driver monitoring system of the second motor vehicle. Using the second computing unit, the criticality analysis may be performed depending on the driver monitoring data, in particular if it is determined that the risk situation exists.

In some examples, driver monitoring data relating to the driver of the second motor vehicle may be generated by means of the driver monitoring system of the second motor vehicle and a second further criticality analysis is performed depending on the driver monitoring data by means of the second computing unit and a second further risk-reducing measure is initiated depending on a result of the second further criticality analysis.

For example, the driver monitoring system can include one or more cameras or gaze tracking devices ("eye tracker") to monitor a position of a body part, for example of the head, of the driver of the second motor vehicle and/or a viewing direction of the eyes of the driver of the second motor vehicle. Therefore, the driver monitoring data can provide information about a cognitive utilization or a cognitive distraction of the driver. Accordingly, the second computing unit can for example recognize based on the driver monitoring data if the driver consciously perceives the first motor vehicle and/or adequately reacts to the first motor vehicle.

In particular, this can be effected irrespective of whether the risk situation exists. For example, this can also be performed if the first motor vehicle is not obscured by the third motor vehicle. Thereby, also in situations, in which the first motor vehicle is not sufficiently cognitively perceived by the driver of the second motor vehicle for other reasons than the geometric obscuration, the risk of a collision can be prevented.

In some examples, it may be determined by means of the second computing unit, depending on the driver monitoring data and depending on the at least one first vehicle-to-environment message, if a further risk situation exists, in which a reduced attention of the driver relating to the first motor vehicle is present. Using the second computing unit, the criticality analysis is performed depending on the driver monitoring data only if it has been determined that the further risk situation exists.

In contrast, if the further risk situation does not exist, but the risk situation, in which the first motor vehicle is obscured by the third motor vehicle, exists, thus, the criticality analysis may be performed independently of the driver monitoring data by means of the second computing unit.

In some examples, it may be determined via the second computing unit, depending on the driver monitoring data and on the at least one first vehicle-to-environment message, if the further risk situation exists, and using the second computing unit, the second further criticality analysis is performed only if it has been determined that the further risk situation exists.

In some examples, the second further criticality analysis is not executed if the further risk situation does not exist.

The examples and embodiment explained herein are preferred embodiments of the present disclosure. In the embodiments, the described components of the embodiment each represent individual features of the present disclosure to be considered independently of each other, which also each develop the present disclosure independently of each other and thereby are also to be regarded as a constituent of the present disclosure in individual manner or in a combination different from the shown one. Furthermore, the described embodiment can also be supplemented by further ones of the already described features of the present disclosure.

In the FIGURE, an exemplary embodiment of a system for reducing a risk of collision according to the improved concept is schematically illustrated.

In the FIGURE, a situation is illustrated, in which a first motor vehicle, such as a motorbike 1, travels on a first road 4a towards a crossroads 5 with a second road 4b and is about to straight traverse it. A second motor vehicle 2, such as a passenger car, approaches the crossroads 5 on a second road 4b and the driver of the second motor vehicle 2 for example intends to turn left into the road 4a at the crossroads 5. Accordingly, the potential trajectories of the motorbike 1 and of the second motor vehicle 2 cross each other in the area of the crossroads 5. In the illustrated exemplary situation, for example the motorbike 1 has the priority with respect to the second motor vehicle 2.

A third motor vehicle 3, such as a delivery vehicle or truck, precedes the motorbike 1 on the same lane of the first road 4a and is for example about to turn right at the crossroads 5. Correspondingly, the third motor vehicle 3 can obscure the motorbike 1 from the view of the second motor vehicle 2 and of a driver of the second motor vehicle 2, respectively. Thereby, an increased risk of collision arises if the driver of the second motor vehicle 2 turns at the crossroads 5 or enters the crossroads 5 without perceiving the motorbike 1.

In the FIGURE, a system 11 for reducing a risk of collision according to the present disclosure is schematically illustrated. The system 11 includes a first computing unit 8 of the motorbike 1 and a first communication interface 6 of the motorbike 1, which is coupled to the first computing unit 8. The system 11 additionally comprises a second computing unit 9 of the second motor vehicle 2 and a second communication interface 7 of the second motor vehicle 2, which is coupled to the second computing unit 9. The communication interfaces 6, 7 are in particular configured as C2X interfaces.

In addition, the system 11 includes a first environmental sensor system 12 of the motorbike 1, which can for example include a radar system. Alternatively or additionally, the first environmental sensor system 12 can also include one or more cameras, lidar systems and/or ultrasonic sensor systems.

In addition, the system 11 includes a second environmental sensor system 13 for the second motor vehicle 2. The second environmental sensor system 13 can for example include one or more cameras, one or more radar systems, one or more lidar systems and/or one or more ultrasonic sensor systems.

By the first environmental sensor system 12, the motorbike 1 is capable of detecting the preceding third motor vehicle 3 and thereby indications of a possible obscuration of the motorbike 1 by the third motor vehicle 3. In particular, the first environmental sensor system 12 can monitor an area in front of and/or next to the motorbike 1 and generate first sensor data based thereon. By means of the first computing unit 8, the first communication interface 6 is then for example controlled for generating at least one C2X message.

In various embodiments, the motorbike 1 can for example transmit status messages, such as CAM messages, in cyclical manner with a frequency of 1 to 10 Hz. In addition, the motorbike 1 can transmit sensor object messages, such as CPM messages, also in permanent and cyclical or cyclical manner, as soon as the preceding third motor vehicle 3 is captured by means of the first computing unit 8 based on the first sensor data. Alternatively, the CPM message can also be cyclically transmitted only if the preceding third motor vehicle 3 is captured and it is determined by means of the first computing unit 8 based on the first sensor data or additional information that the crossroads 5 follows within a preset range or within a preset distance.

To this end, the first computing unit 8 can use online or offline map data, status indications of the preceding third motor vehicle 3, such as an active turn signal, or C2X infrastructure messages from infrastructure devices, such as traffic lights or the like.

For identifying that the crossroads 5 is within the preset distance, other methods can also be used. For example, the motorbike 1 can receive C2X messages of other motor vehicles, for example of the third motor vehicle 3, and obtain a travel history transmitted therewith, thus for example waypoints of the distance lastly traveled within the last 100 to 500 m. Based thereon, the first computing unit 8 can then perform the corresponding examination.

Also, the second motor vehicle 2 can communicate C2X messages, for example CAM or CPM messages, which are received by the motorbike 1, using the first communication interface 6.

The third motor vehicle 3 can be captured by the first computing unit 8 based on the first sensor data and/or by the second computing unit 9 based on the at least one C2X message from the motorbike 1.

Based thereon, the second computing unit 9 and the first computing unit 8 can perform a risk assessment and/or criticality estimation to correspondingly warn the respective driver or to automatically perform an intervention in the control of the respective motor vehicle depending on a result of the estimation.

Thus, both the driver of the second motor vehicle 2 and the motorcyclist of the motorbike 1 can be warned in the area of the crossroads 5 by the improved concept if a collision is probable and for example the sight between the motor vehicles 1, 2 is obscured by the third motor vehicle 3.

To this end, trigger conditions can be set for the warning of the driver of the second motor vehicle and for the warning of the rider of the motorbike 1, respectively.

In some examples, trigger conditions for the driver of the second motor vehicle 2 may include that the second motor vehicle 2 approaches the crossroads 5, already stands at a stop line of the crossroads 5, or is about to enter the crossroads area of the crossroads 5. The trigger conditions can also include that the second motor vehicle does not have priority at the crossroads 5. The trigger conditions can also include that a motorbike approaches the crossroads 5, for example from the left. The trigger conditions can also include that the motorbike 1 cyclically transmits CAM messages and/or transmits CPM messages, wherein the CPM messages include information relating to the preceding third motor vehicle 3. The trigger conditions can also include that the CPM messages of the motorbike 1 include information to the effect that the third motor vehicle 3 is about to turn, in particular to turn right, and possibly therefore reduces its speed. The trigger conditions can also include that the predicated arrival of the motorbike 1 in the area of the crossroads 5, in particular in the area of a possible intersection of the trajectories, coincides in time with the arrival or planned start of the second motor vehicle 2 or is within a preset time interval.

The trigger conditions for the warning of the driver of the second motor vehicle can also include that evaluations of driver monitoring data by the second computing unit 9 indicate that the driver of the second motor vehicle 2 does not consciously perceive the motorbike 1. To this end, the system 11 can for example include a driver monitoring system 10 for monitoring a viewing direction or head position of the driver of the second motor vehicle. Thereby, an interior monitoring or driver monitoring of the driver of the second motor vehicle can be performed. The driver monitoring data can be correspondingly evaluated to consider a cognitive distraction of the driver.

The mentioned trigger conditions can be provided in various combinations. If one or more of the trigger conditions apply, in particular according to preset regulations, thus, a warning is for example displayed to the driver of the second motor vehicle or a warning sound is played back, which indicates the motorbike 1. Therein, the indication can for example be effected multilevel, according to criticality and probability of a possible collision. To this end, it can for example be differentiated based on the temporal intersection of the trajectories, based on a driving behavior of the driver of the second motor vehicle 2 or based on the probability of obscuration of the motorbike 1 from the view of the driver of the second motor vehicle 2.

Additionally or alternatively, it is also possible to preload the brake systems of the second motor vehicle 2 or to increase the brake pressure or to initiate an automatic braking action or, if the second motor vehicle 2 stands, to prevent it from moving off.

Correspondingly, one or more trigger conditions can also be provided for a warning for the rider of the motorbike 1. The trigger conditions for the rider of the motorbike 1 can for example include that the motorbike 1 approaches the crossroads 5 and/or that the third motor vehicle 3 is in front of the motorbike 1. This can in particular be captured by means of the first environmental sensor system 12 or based on C2X messages, which the third motor vehicle 3 transmits. The trigger conditions for the rider of the motorbike 1 can also include that the third motor vehicle 3 is about to turn. For example, this can be determined by a turn signal status of the third motor vehicle 3 from a CAM message of the third motor vehicle 3 and/or based on the first sensor data. Alternatively or additionally, the imminent turning of the third motor vehicle 3 can also be captured by a reduction of the speed of the third motor vehicle 3.

The trigger conditions for the warning for the driver of the motorbike 1 can also include that the second motor vehicle 2 approaches the crossroads 5 or already stands at the stop line. This can for example be recognized by C2X, in particular CAM messages, transmitted by the second motor vehicle 2 or by recognizing a priority situation based on internal map data, map messages of an infrastructure device of the crossroads 5 or for example based on a traffic sign recognition based on the first sensor data.

If one or more trigger conditions, which can also be provided in any combination, apply, the motorcyclist is thus warned with suitable means. Also here, the indication can be effected multilevel, according to criticality and probability of a possible collision. Here, it can be differentiated based on the temporal intersection of the potential trajectories based on the driving behavior of the driver of the motor vehicle 2 and/or of the motorcyclist, based on the probability of the obscuration of the motor vehicle 2 from the view of the driver of the motorbike 1 and so on. Here too, the indication to the driver of the motorbike 1 can be visually, acoustically or haptically effected.

Alternatively or additionally, an emergency braking or a brake intervention can also be automatically initiated to reduce the severity of a collision.

As described, a method and a system are specified by the improved concept, by which the probability or severity of a collision between two motor vehicles, wherein one of the two motor vehicles is obscured by a further motor vehicle, can be reduced. In various embodiments, a passenger car protective function is in particular allowed thereby, which specifically allows the protection and avoiding accidents with obscured motorbikes in the area of crossroads or junctions.

LIST OF REFERENCE SIGNS 1 motorbike
2 motor vehicle
3 motor vehicle
4a, 4b road
5 crossroads
6 communication interface
7 communication interface
8 computing unit
9 computing unit
10 driver monitoring system
11 system for reducing a risk of collision
12 environmental sensor system
13 environmental sensor system

The invention claimed is:

1. A method for reducing a risk of collision between a first motor vehicle and a second motor vehicle, comprising:
   receiving at least one first vehicle-to-environment message at a second computing unit of the second motor vehicle, from the first motor vehicle, wherein the message comprises real-time sensor data generated by at least one environmental sensor of the first motor vehicle, the real-time sensor data comprising radar, lidar, or camera data indicative of a position of a third motor vehicle preceding the first motor vehicle;
   processing, via the second computing unit, the received vehicle-to-environment message to determine if a risk situation exists in which the real-time sensor data indicates a third motor vehicle preceding the first motor vehicle, and the first motor vehicle is obscured for at least one of:
      (i) a driver of the second motor vehicle, or
      (ii) an environmental sensor system of the second motor vehicle;
   performing a criticality analysis if the second computing unit determines that the risk situation exists, wherein the criticality analysis comprises comparing the real-time sensor data of the first motor vehicle with at least one predefined safety threshold to predict a potential collision; and
   initiating a risk-reducing measure, based on the criticality analysis.

2. The method according to claim 1, wherein the at least one first vehicle-to-environment message is received, depending on first sensor data of the first vehicle, the first sensor data comprising environmental sensor system data in front of the first motor vehicle in a direction of travel.

3. The method according to claim 2, wherein the at least one first vehicle-to-environment message comprises a first vehicle-to-environment sensor message relating to the first sensor data, and wherein the first vehicle-to-environment sensor message is cyclically transmitted.

4. The method according to claim 2, further comprising
   processing the first sensor data, via a first computing unit of the first motor vehicle, to determine if a further motor vehicle is within a preset range in front of and/or next to the first motor vehicle; and
   transmitting the first vehicle-to-environment sensor message if the first computing unit determines that the further motor vehicle is within the preset range.

5. The method according to claim 2, further comprising
   determining, via a first computing unit, if a crossroad or junction is within a preset distance from the first motor vehicle; and
   transmitting the first vehicle-to-environment sensor message if it is determined that the crossroads or junction is within the preset distance.

6. The method according to claim 1, further comprising
   transmitting at least one second vehicle-to-environment message from the second motor vehicle to the first motor vehicle;
   performing a further criticality analysis, via a first computing unit of the first motor vehicle, to determine if a further motor vehicle is within a preset range from the first motor vehicle; and
   initiating a further risk-reducing measure via the first computing unit, based on the performed further criticality analysis.

7. The method according to claim 1, wherein the at least one first vehicle-to-environment message comprises a first vehicle-to-environment status message relating to a state of the first motor vehicle, and wherein the first vehicle-to-environment status message is cyclically transmitted.

8. The method according to claim 1, wherein the risk-reducing measure comprises
   outputting a visual, acoustic and/or haptic warning for the driver of the second motor vehicle;
   an automatic intervention in a control of the second motor vehicle; and/or
   outputting a visual and/or acoustic warning into an environment of the second motor vehicle.

9. The method according to claim 1, further comprising
   generating driver monitoring data relating to the driver of the second motor vehicle via a driver monitoring system of the second motor vehicle, and
   performing the criticality analysis based on the driver monitoring data; and/or
   performing a second criticality analysis based on the driver monitoring data, and initiating a second risk-reducing measure depending on a result of the second further criticality analysis.

10. A system for reducing a risk of collision between a first motor vehicle and a second motor vehicle, comprising:
    a second computing unit of the second motor vehicle; and
    a second communication interface of the second motor vehicle configured to receive at least one first vehicle-to-environment message, wherein the message comprises real-time sensor data generated by at least one environmental sensor of the first motor vehicle, the real-time sensor data comprising radar, lidar, or camera data indicative of a position of a third motor vehicle preceding the first motor vehicle;
    wherein the second computing unit is configured to
       process the received vehicle-to-environment message to determine if a risk situation exists in which the real-time sensor data indicates a third motor vehicle preceding the first motor vehicle and the first motor vehicle is obscured for at least one of: (i) a driver of the second motor vehicle, or (ii) an environmental sensor system of the second motor vehicle;
       perform a criticality analysis if the second computing unit determines that the risk situation exists, wherein the criticality analysis comprises comparing the real-time sensor data of the first motor vehicle with at least one predefined safety threshold to predict a potential collision; and
       initiate a risk-reducing measure, based on the criticality analysis.

11. The system according to claim 10, wherein the at least one first vehicle-to-environment message is received, depending on first sensor data of the first vehicle, the first sensor data comprising environmental sensor system data in front of the first motor vehicle in a direction of travel.

12. The system according to claim 11, wherein the at least one first vehicle-to-environment message comprises a first vehicle-to-environment sensor message relating to the first sensor data, and wherein the first vehicle-to-environment sensor message is cyclically transmitted.

13. The system according to claim 11, further comprising
    a first computing unit of the first motor vehicle configured to process the first sensor data to determine if a further motor vehicle is within a preset range in front of and/or next to the first motor vehicle; and
    a first communication interface for the first motor vehicle, configured to transmit the first vehicle-to-environment sensor message if the first computing unit determines that the further motor vehicle is within the preset range.

14. The system according to claim 11, further comprising
a first computing unit of the first motor vehicle, configured to determine if a crossroad or junction is within a preset distance from the first motor vehicle; and
a first communication interface for the first motor vehicle, configured to transmit the first vehicle-to-environment sensor message if it is determined that the crossroads or junction is within the preset distance.

15. The system according to claim 10, wherein the second communication interface is configured to transmit at least one second vehicle-to-environment message from the second motor vehicle to the first motor vehicle, and further comprising
a first computing unit of the first motor vehicle, configured to perform a further criticality analysis, to determine if a further motor vehicle is within a preset range from the first motor vehicle, and initiate a further risk-reducing measure based on the performed further criticality analysis.

16. The system according to claim 10, wherein the at least one first vehicle-to-environment message comprises a first vehicle-to-environment status message relating to a state of the first motor vehicle, and wherein the first vehicle-to-environment status message is cyclically transmitted.

17. The system according to claim 10, wherein the second computing unit is configured to initiate the risk-reducing measure by
outputting a visual, acoustic and/or haptic warning for the driver of the second motor vehicle;
performing an automatic intervention in a control of the second motor vehicle; and/or
outputting a visual and/or acoustic warning into an environment of the second motor vehicle.

18. The system according to claim 10, further comprising a driver monitoring system of the second motor vehicle, configured to generate driver monitoring data relating to the driver of the second motor vehicle, wherein the second computing unit is configured to
performing the criticality analysis based on the driver monitoring data; and/or
performing a second criticality analysis based on the driver monitoring data, and initiate a second risk-reducing measure depending on a result of the second further criticality analysis.

19. A method for reducing a risk of collision between a first motor vehicle and a second motor vehicle, comprising:
receiving at least one first vehicle-to-environment message at a second computing unit of the second motor vehicle, from the first motor vehicle, wherein the at least one first vehicle-to-environment message comprises real-time sensor data generated by at least one environmental sensor of the first motor vehicle, the real-time sensor data comprising radar, lidar, or camera data indicative of a position of a third motor vehicle preceding the first motor vehicle;
processing, via the second computing unit, the received vehicle-to-environment message to determine if a risk situation exists in which the real-time sensor data indicates a third motor vehicle preceding the first motor vehicle and the first motor vehicle is obscured for at least one of:
(i) a driver of the second motor vehicle, or
(ii) an environmental sensor system of the second motor vehicle;
performing a criticality analysis if the second computing unit determines that the risk situation exists, wherein the criticality analysis comprises comparing the real-time sensor data of the first motor vehicle with at least one predefined safety threshold to predict a potential collision; and
initiating a risk-reducing measure, based on the criticality analysis.

20. The method according to claim 19, wherein the at least one first vehicle-to-environment message further comprises a first vehicle-to-environment status message relating to a state of the first motor vehicle.

* * * * *